United States Patent [19]

Ishiwata et al.

[11] 4,420,069
[45] Dec. 13, 1983

[54] AUTOMATIC CLUTCH

[75] Inventors: Hideyuki Ishiwata, Kawasaki; Kunihiro Ishino, Yokohama, both of Japan

[73] Assignee: Automobile Parts Manufacturing Company Limited, Japan

[21] Appl. No.: 174,607

[22] Filed: Aug. 1, 1980

[30] Foreign Application Priority Data

Aug. 24, 1979 [JP] Japan .................. 54-107820

[51] Int. Cl.³ .................. F16D 11/00; F16D 43/02
[52] U.S. Cl. .................. 192/35; 192/54; 192/93 A; 192/67 R
[58] Field of Search .............. 192/93 A, 54, 55, 93 R, 192/35, 67 R, 50, 36

[56] References Cited

U.S. PATENT DOCUMENTS

| | | | |
|---|---|---|---|
| 3,217,847 | 11/1965 | Petrak | 192/67 R |
| 3,306,406 | 2/1967 | Poliseo | 192/35 X |
| 3,656,598 | 4/1972 | Goble | 192/50 |
| 4,163,486 | 8/1979 | Kagata | 192/35 |
| 4,227,599 | 10/1980 | Ishiwata et al. | 192/54 |

*Primary Examiner*—George H. Krizmanich
*Attorney, Agent, or Firm*—McGlew and Tuttle

[57] ABSTRACT

An automatic clutch disposed between driving and driven members comprises, on the driving side, a drive clutch movable only axially relative to other parts and normally biased in the declutching direction, an outer cam located on the side where the drive clutch is biased and moved, the cam being adapted to move in the same way as the drive clutch, with a spring disposed between the outer cam and the drive clutch to bias them away from each other, and a stationary inner cam adapted to be connected to or disconnected from the outer cam according as the clutch disengages or engages, the inner cam having projections. A holdout ring has projections to be engaged with the projections of the inner cam and adapted to keep the outer and inner cams out of connection when the driving side stops, the holdout ring being fitted over the outer cam under such frictional conditions that, only when the ring has engaged the inner cam, it can circumferentially slide relative to the outer cam. On the driven side, a driven clutch is secured to the driven member.

1 Claim, 15 Drawing Figures

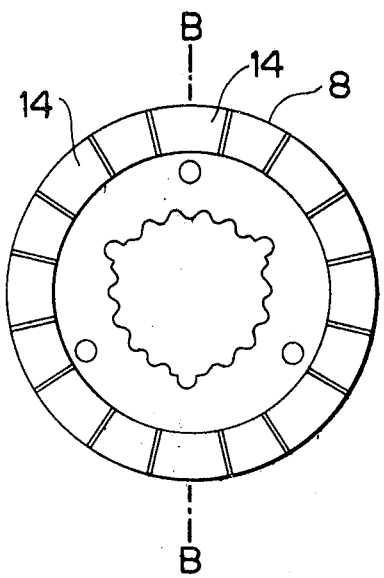
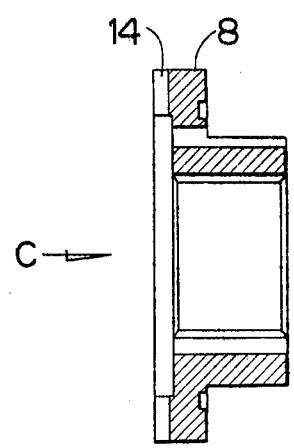
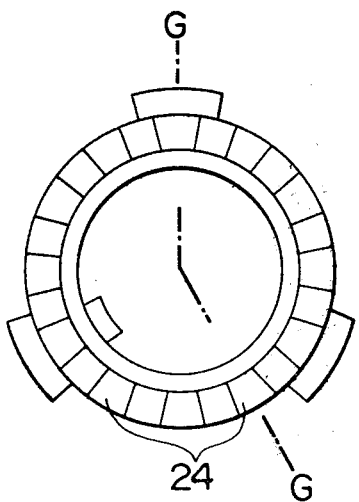
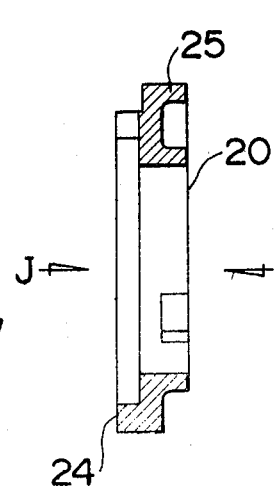
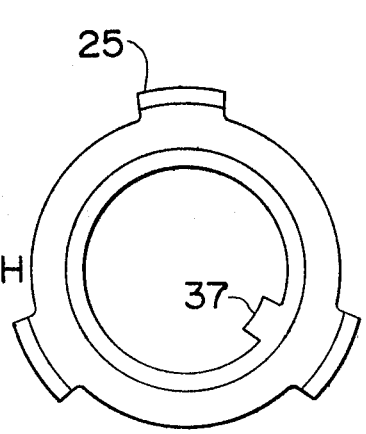

AUTOMATIC CLUTCH

FIELD AND BACKGROUND OF THE INVENTION

This invention relates to an automatic clutch to be disposed between driving and driven members to connect and disconnect the two.

The all-wheel drive employed by certain automobiles and the like is an effective system for making full use of the driving power and braking force of the engine when the vehicle runs on snow-laden and frozen roads, paths in hills, wastelands, or other rough terrain. On ordinary roads, however, the all-wheel driven vehicle would involve the operation of the extra drive-shaft power train and hence produce wasteful consumption of energy and added running noise. For these reasons a special clutch, i.e., free-wheel hub is in use which disconnects the unnecessary drive-shaft system not only from the driving side but also from the road wheel side. To actuate the free-wheel hub, the driver usually must stop the vehicle, go to the vicinity of each wheel equipped with such a hub, and then shift such hub position by hand. In attempts to obviate the inconvenience, devices designed for automatic rather than manual control have been developed in recent years. Nevertheless, they still have shortcomings in that the engine brake will not work, the construction is relatively complex, or the mechanism has to be actuated whenever the vehicle stops. In light of this, we previously developed an automatic clutch which required no manipulation by the driver outside of his vehicle and permits rapid and simple shifting, without any of the disadvantages described above (copending Japanese Patent Application No. 30332/1978, U.S. patent application Ser. No. 916,144, and Canadian Patent Application No. 318,968). However, that automatic clutch sometimes applies an excessive load on part of its structural members due to inadequate timing of engagement, and it was found that, when used in applications where a powerful torque was to be transmitted, the clutch could pose durability problems abut its components.

The automatic clutch in question is constructed as shown in FIG. 15. An annular inner cam a has cam teeth projecting toward a drive clutch b and is secured to the car body with a nuckle i. The drive clutch b has teeth on both sides and is fitted with a sleeve m on a drive shaft f by splines in such a manner that it can rotate with, and slide axially of, the shaft. It is normally biased by a spring r in the declutching direction (rightwardly as shown). A driven clutch d is splined on the outer surface for sliding contact with a housing g and is normally biased by a spring n toward the drive clutch b. When the corresponding teeth of the inner cam a and the drive clutch b are in mesh, the teeth t on the opposite side of the drive clutch and that of the driven clutch e are out of mesh. Conversely, when the inner cam a and the drive clutch b are disengaged onto the teeth (flattened cam projections or lands) of each other, the teeth t of the drive clutch b and the teeth e of the driven clutch d are in mesh. A holdout ring j is fitted slidably on the outer periphery of the drive clutch b. Along its edge the ring has projections adapted to engage the inner cam a. The lower half of FIG. 15 illustrates the automatic clutch in the declutched state. The drive clutch b and the driven clutch d are out of mesh, cutting off the drive. The upper half of the figure shows the clutch engaged, with the rotation of the drive shaft f being transmitted through the sleeve m, drive clutch b, driven clutch d, housing g, and hub s to the road wheel.

In the previously proposed automatic clutch of the construction just described, the inner cam a and the drive clutch b are directly engaged, and therefore, when they are half out of mesh, with their teeth half atop each other, the teeth t on the other side of the drive clutch b may sometimes come half into mesh with the teeth e of the driven clutch d. When this happens, the torque from the drive shaft f is transmitted through the drive clutch b to the driven clutch d. Consequently, the torque is applied to the splined connecting part h between the driven clutch d and the housing g. The inner cam a exerting its force in the clutching direction is then subjected to a heavy load, and hence the connector (e.g., a key in a keyway) between the nuckle i and the inner cam a will be under a heavy load. When the automatic clutch is used in applications where a powerful torque is to be transmitted, the connector will present a durability problem, sometimes breaking down under the burden it must carry.

SUMMARY OF THE INVENTION

The present invention has been perfected in view of the foregoing and has for its object to provide an automatic clutch which is located between driving and driven members and capable of automatically connecting and disconnecting the two members, in such a manner that it is not released unless the driven side is reversely rotated, and with no durability problem posed in its applications involving the transmission of powerful torques.

The invention resides in an automatic clutch disposed between driving and driven members comprising, on the driving side, a drive clutch movable only axially relative to the associated parts and normally biased in the declutching direction, an outer cam located on the side where the drive clutch is biased and moved, said cam being adapted to move in the same way as the drive clutch, with a spring disposed between the outer cam and the drive clutch to bias them away from each other, a stationary inner cam adapted to be connected to or disconnected from the outer cam according as the clutch disengages or engages, said inner cam having projections, a holdout ring having projections to be engaged with the projections of the inner cam and adapted to keep the outer and inner cams out of connection when the driving side stops, said holdout ring being fitted over the outer cam under such frictional conditions that, only when the ring has engaged the inner cam, it can circumferentially slide relative to the outer cam, and, on the driven side, a driven clutch fixedly mounted on the driven member.

BRIEF DESCRIPTION OF THE DRAWINGS

The above and other objects, advantages, and features of the invention will become obvious from the following description taken in connection with the drawings, in which:

FIG. 6 is a sectional view of the drive clutch taken along the line B—B of FIG. 7;

FIG. 7 is a view looking in the direction of the arrow C in FIG. 6;

FIG. 12 is a sectional view of the inner cam taken along the line G—G of FIG. 14;

FIG. 13 is a view looking in the direction of the arrow H in FIG. 12;

FIG. 14 is a view looking in the direction of the arrow J in FIG. 12; and

DESCRIPTION OF THE PREFERRED EMBODIMENT

The automatic clutch according to the invention will now be described in detail in connection with an embodiment thereof incorporated in a free-wheel hub of an all-wheel driven vessel.

Figure 1:
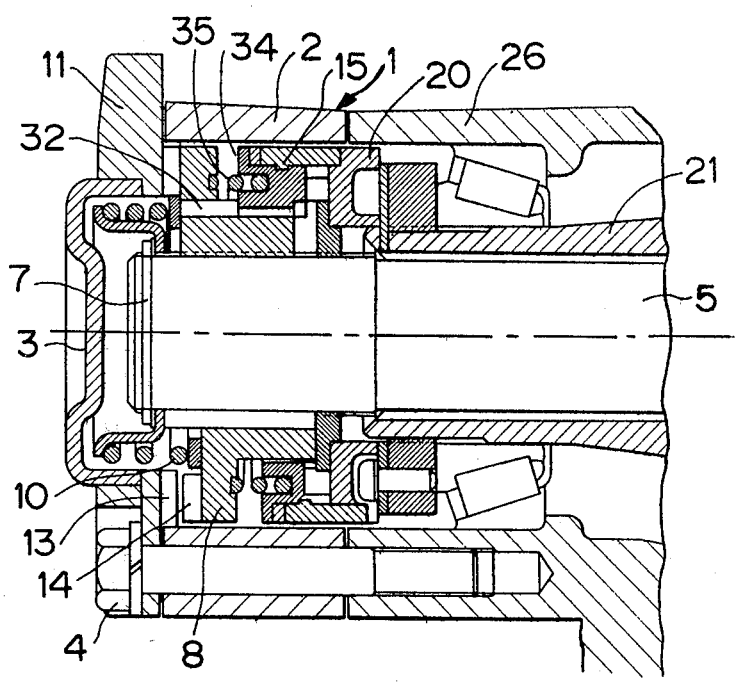
FIG. 1 is a sectional side view of an embodiment of the invention, the lower half showing the clutch disengaged and the upper half the clutch engaged.
Figure 2:
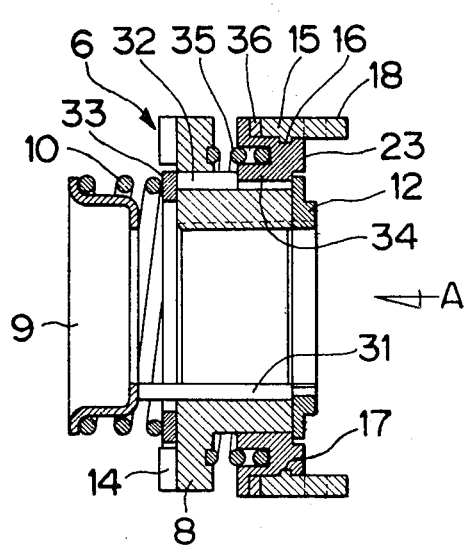
FIG. 2 is a side sectional view of the drive clutch assembly.
Figure 3:
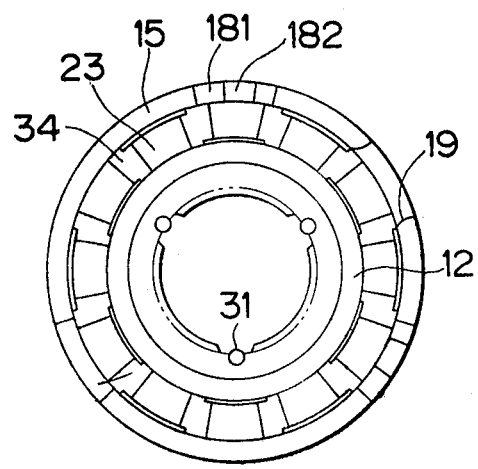
FIG. 3 is a cross sectional view as seen in the direction of the arrow A in FIG. 2.

Referring to FIG. 1, there are shown a free-wheel hub assembly 1, housing 2, hub cap 3, and driven clutch 11. The hub cap 3 is force fitted or otherwise fixed to the annular driven clutch 11. The driven clutch 11 and housing 2 are secured to the road wheel side by a plurality of bolts 4. A drive shaft 5, coupled at one end to a prime mover, is at the other end so machined and connected, for example, splined, to a drive clutch assembly 6 (FIGS. 2 and 3) so as to rotate together but move axially relative to each other. A snap ring 7 keeps the drive clutch assembly 6 from slipping out of the drive shaft 5.

Figure 8:
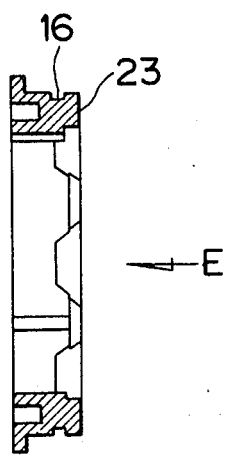
FIG. 8 is a sectional view of the outer cam taken along the line D—D of FIG. 9.
Figure 9:
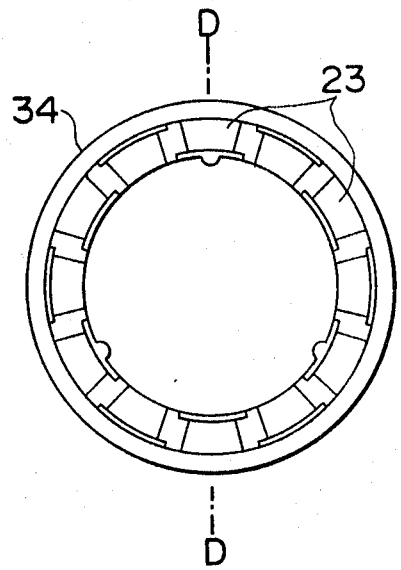
FIG. 9 is a view looking in the direction of the arrow E in FIG. 8.
Figure 11:
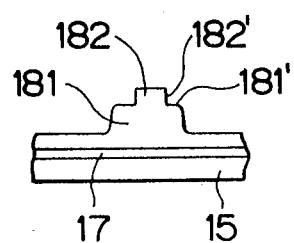
FIG. 11 is a view looking in the direction of the arrow F in FIG. 10.
Figure 10:
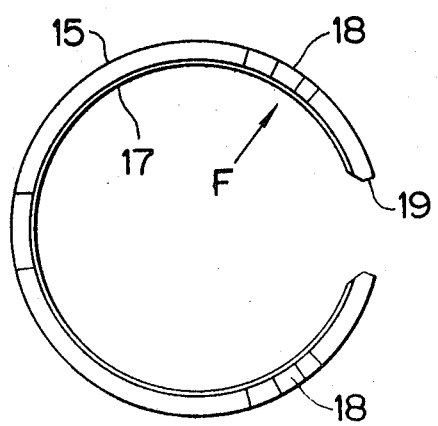
FIG. 10 is a plan view of the holdout ring.

The drive clutch assembly 6 is built as follows. On opposite axial ends of an annular drive clutch 8 are disposed a spring retainer 9 and a thrust washer 12, which are secured together by a plurality of thrust pins 31. The drive clutch 8 is formed with teeth 14 adapted to face and mesh with the teeth 13 on the periphery of the driven clutch 11 (FIGS. 6 and 7). A plurality of return pins 32, disposed at predetermined intervals in a circular arrangement, extend in parallel and axially through the drive clutch 8 and are fixed at right angles to one side of an annular return plate 33 abutted to the end face of the drive clutch 8. Between the return plate 33 and a spring retainer 9 is disposed a spring 10, which normally biases the return plate 33 and return pins axially rightward. On the outer periphery of the stem of the drive clutch 8 is slidably mounted an outer cam 34, and a spring 35 interposed between the cam and the drive clutch biases them away from each other. One end of the outer cam 34 is abutted against the ends of the return pins 32. The opposite end is formed with a plurality of cam teeth 23 in a circular arrangement, and is kept from axial movement by the flange-like rim of the thrust washer 12 (FIGS. 8 and 9). A holdout ring 15 includes an annular rib 17 formed on its inner periphery and fitted in an annular groove 16 on the outer periphery of the outer cam 34. This annular rim 17 eliminates the possibility of the holdout ring 15 slipping off from the outer cam 34. These parts are placed under such frictional conditions that, only when subjected to a rotational force in excess of a predetermined level, the outer cam 34 and the holdout ring 15 will rotate relative to each other. On the other end of the holdout ring 15 are formed a plurality of projections 18 in certain spaced relation. Each of the projections 18 consist of a circumferentially broadened first-step projection 181 and an axially extended, narrow second-step projection 182 (FIGS. 10 and 11). The first-step projection 181 has a corner face 181' parallel to the circumference of the holdout ring 15 and which supports a circumferential corner face 251 of each projection 25 of an inner cam 20 to be described later, whereby the outer cam 34 is kept from moving axially and from engaging the inner cam 20. The second-step projection 182 has a corner face 182' in contact with another corner face 252 parallel to the axis of the projection 25 of the inner cam 20 so as to prevent the revolution of the holdout ring 15 itself. The height of the first-step projection 181 (or its length in the axial direction) and the projection 25 of the inner cam 20 are correlated so that they contact each other, in the manner already described, at the point where the teeth 23 of the outer cam 34 and the teeth 24 of the inner cam 20 ride on each other. The arrangement is also such that, when the teeth 23 of the outer cam 34 and the teeth 24 of the inner cam 20 are in mesh, the drive clutch 8 and the driven clutch 11 are eventually disengaged. The holdout ring 15 is an incomplete circle, and the gap or cutaway section 19 permits the ring to be spread to a diameter large enough for its annular rib 17 to be snapped into the groove 16 of the outer cam 34. The numeral 36 indicates an annular thrust metal. The construction of the drive clutch assembly has so far been described.

The inner cam 20 is secured to the nuckle 21 of the car body by conventional means. In the embodiment being described, a key 37 formed on part of the inner periphery of the inner cam 20 is fitted in a corresponding groove of the nuckle 21. On the mating faces of the outer cam 34 and the inner cam 20 are formed, respectively, pluralities of intermeshing cam teeth 23 and 24, all flattened on top, in a circular arrangement. The inner cam 20 has a given number of L-shaped projections 25 on its outer periphery (FIGS. 12 through 14). The numeral 26 designates a hub.

The free-wheel hub embodying the invention is shown in its disengaged state in the lower half section of FIG. 1.

In the sectional view the teeth 13 of the driven clutch 11 and the teeth 14 of the drive clutch 8 are out of mesh. Consequently, the rotational force to be transmitted from the road wheel through the hub 26, housing 2, and driven clutch 11 to the drive clutch 8 is shut off, leaving the wheel free. The drive power train, from the drive clutch 8 to the differential gear and propeller shaft (both not shown) through the drive shaft 5, is not rotated by the rotational force of the wheel.

Figure 4:
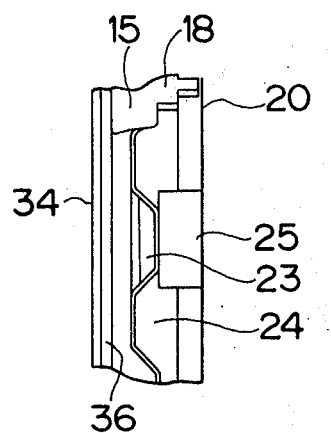
FIG. 4 is a fragmentary view of the inner and outer cams engaged in the declutched state.
Figure 5:
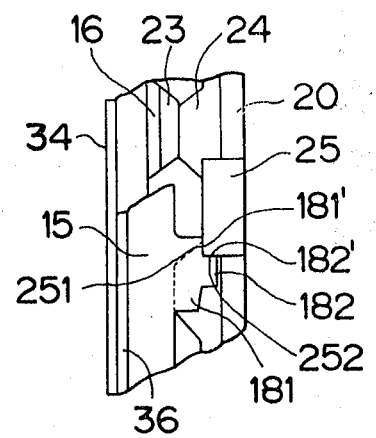
FIG. 5 is a fragmentary view of the inner and outer cams in the clutched state.

The free-wheel hub in the engaged condition during all-wheel drive is illustrated in section in the upper half of FIG. 1. Now if the front-drive system of the transfer is set to the ON position for all-wheel driving while the free-wheel hub is in the state shown in the lower half section of FIG. 1, the drive from the engine will be transmitted to the drive shaft 5. Accordingly, the drive clutch assembly 6 will begin running. As the drive clutch 8 and the outer cam 34 begin to run together, the cam teeth 23 of the outer cam 34 and the cam teeth 24 of the inner cam 20 secured to the vehicle body, initially in mesh as shown in FIG. 4, will disengage, riding over the teeth or lands of each other as in FIG. 5. This will cause the outer cam 34 to move with the return pins 32, against the urging of the spring 10, leftwardly as viewed in FIG. 1. The drive clutch 8, too, will be forced leftwardly with the spring 35 until the teeth 14 of the drive clutch 8 comes into mesh with the teeth 13 of the driven clutch 11. When those teeth meet out of phase, with the tooth tops in contact, the drive clutch 8 will stay in that position against the force of the spring 35. With further rotation of the drive clutch 8 the teeth 14 and 13 will come into mesh, where their phases coincide, with the aid of the recovering force of the spring 35. On the other hand, the revolution of the outer cam 34 causes the holdout ring 15 to run, too. However, as the inner cam 20 and the outer cam 34 continue to run, with the tops of their cam teeth 24, 23 riding on each other, the two-step projections 18 on the periphery of the holdout ring 15 will come into contact with the sides of the projections 25 of the inner cam 20. In other words, as shown in FIG. 5, the corners of the projections 25 are supported by the corner faces 181' and the corner faces 182' formed by the firststep projections 181 and the second-step projections 182 of the projections 18. Thus, with the corner faces 252 of the projections 25 in contact with the corner faces 182' of the projections 18, the holdout ring 15 alone will stop in that position and the outer cam 34 will continue running together with the drive clutch 8 while maintaining a sliding relation with the holdout ring 15. Since the corners of the projections 25 of the inner cam 20 remain supported by the shoulders of the projections 18 of the holdout ring 15, the corner faces 251 of the projections 25 are in contact with the corner sides 181' of the first-step projections 181, and the outer cam 34, too, is kept from moving toward the inner cam 20. Thus, even if the outer cam 34 may at any point during its revolution bring its cam teeth 23 to the same phase as the cam teeth 24 of the inner cam 20, both the teeth will not mesh at all. The drive from the drive shaft 5 will now be transmitted through the drive clutch 8, driven clutch 11, housing 2, and hub 26 to the wheel.

With the construction described, the drive clutch 8 and the driven clutch 11 remain engaged while they are running in the same direction, regardless of whether the engine is in a tracting or braking operation. If the drive clutch 8 and the driven clutch 11 in mesh are driven to the reverse (for example, when the advancing vehicle is temporarily driven back), they will be disengaged for a moment. However, the engagement will soon be reestablished, because the other sides of the projections 25 of the inner cam 20 contact the other projections 18 of the holdout ring 15 (FIG. 10). This condition is maintained as long as the transfer is in the ON position for the front-wheel drive.

The procedure for releasing the free-wheel hub from its engaged state will now be explained. First, the front-drive system of the transfer is shifted to the OFF position to shut off the transmission of the drive to the drive shaft 5. Next, the drive clutch 11 and the associated parts are caused to run in the reverse direction. Actually this can be accomplished by merely driving the vehicle slowly in the opposite direction. The distance of the reverse movement need not be more than about a quarter revolution of the road wheels. Turning force from each wheel is now transmitted to the hub 26, housing 2, driven clutch 11, drive clutch 8, outer cam 34, and holdout ring 15. The revolution of the holdout ring 15 releases the engagement shown in FIG. 5 by bringing the shoulders of its projections 18 out of engagement with the corners of the projections 25 of the inner cam 20. As a consequence, the outer cam 34 is moved rightward as viewed in FIG. 1 by virtue of the spring 10 at the point where the phase of the cam teeth 23 of the outer cam 34 coincides with that of the cam teeth 24 of the inner cam 20, and the outer cam meshes with the inner cam as in FIG. 4. The driven clutch 11 and the drive clutch 8 are then disengaged and, as already stated, they are not reengaged unless the drive is transmitted from the drive shaft 5.

As described, the device according to the invention is located between driving and driven members and is so built as to accomplish automatic connection and disconnection of the two. For example, let the driving and driven members be, respectively, A (corresponding to the driveshaft side of the embodiment above described) and B (corresponding to the wheel side), then the arrangement incorporating the present invention will have the following functions:

(1) Turning the A side will enable the clutch to engage, thus causing the revolution of the B side, too.

(2) As long as the A side is kept running (forwardly or reversely), the clutch will remain engaged and the drive can be established from whichever side, A or B.

(3) The clutch is disengaged only when the A side (and hence the B side, too) is brought to a stop, and the B side is turned to the reverse direction through a predetermined angle (which is suitably chosen according to the design conditions).

(4) After the clutch disengagement, the declutched state will continue as long as the A side is kept stationary. Hence the B side will be free to run forward, stop, and roll backward.

Figure 15:
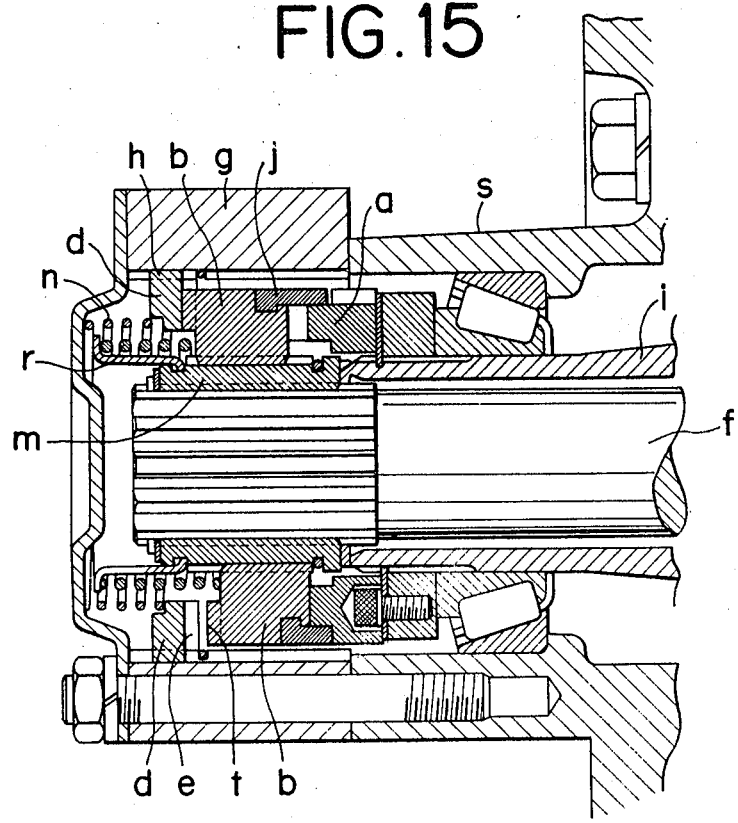
FIG. 15 is a side sectional view of an automatic clutch of the prior art subsequently improved according the present invention.

In the previously developed automatic clutch (copending Japanese Patent Application No. 30332/1978, U.S. patent application Ser. No. 916,144, and Canadian Patent Application No. 318,968), as illustrated in FIG. 15, the inner cam a and the drive clutch b are directly engaged, and therefore, when they are half out of mesh, with their teeth half atop each other, the teeth t on the other side of the drive clutch b may sometimes come half into mesh with the teeth e of the driven clutch d. When this happens, the torque from the drive shaft f is transmitted through the drive clutch b to the driven clutch d. Consequently, the torque is applied to the splined connecting part h between the driven clutch d and the housing g. The inner cam a exerting its force in the clutching direction is then subjected to a heavy load, and hence the connector (e.g., a key in a keyway) between the nuckle i and the inner cam a will be under a heavy load. When the automatic clutch is used in applications where a powerful torque is to be transmitted, the connector will present a durability problem, sometimes breaking down under the burden it carries. With the device of the invention, by contrast, the inner cam 20 is not subjected to any heavy load due to the half-meshing even when the irregular engagement described immediately above takes place. This is because the driven clutch 11 and the housing 2 are not splined, the drive clutch 8 is urged by the outer cam 34 with the spring 35 in the clutching direction, and the inner cam 20 is adapted to engage the outer cam 34, with the spring 10 biasing the outer cam 34 through return pins 32.

As has been described hereinabove, the device according to the invention is disposed between two rotatable members and can automatically control the transmission of the drive by simply controlling the rotation of the respective members. Moreover, it can keep the both members coupled unless the driven side is rotated reversely. When the device of the invention has been used with the free-wheel hubs of an all-wheel driven vehicle or the like, for example, it is no longer necessary for the driver to get down the vehicle and manipulate the free-wheel units as in the past. Thus rapid and simple shifting of the units is made possible. Unlike the existing automatic mechanisms which can automatically operate the free-wheel hubs but render it impossible to apply the engine brake, the automatic clutch of the invention accomplishes the both. Also, it is free from the inconvenience of the conventional arrangements that, each time the vehicle stops, the clutch works to disengage the driving and driven members from each other, with consequent wear and other detrimental effects upon the life of the parts. Thus a durable automatic clutch is obtained which precludes the danger of its component parts being worn or broken in applications where a powerful torque is to be transmitted.

What is claimed is:

1. An automatic clutch disposed between driven members comprising, on the driving side, a drive clutch movable only axially relative to the driving member and normally biased in a declutching direction, an outer cam located on the side of said drive clutch to which it is biased, said cam being adapted to move in the same way as said drive clutch, with a spring disposed between said outer cam and said drive clutch to bias them away from each other, a stationary inner cam adapted to be connected to or disconnected from said outer cam as said automatic clutch disengages or engages respectively, said inner cam having projections, a holdout ring having projections to be engaged with said projections of said inner cam and adapted to keep said outer and inner cams out of connection when the driving side stops, said holdout ring being fitted over said outer cam under such frictional conditions that, only when said ring has engaged said inner cam, said ring can rotate relative to said outer cam, and, on the driven side, a driven clutch fixedly mounted on the driven member, said driven and drive clutches having facing teeth which are engaged upon movement of said drive clutch against its normal bias to engage said automatic clutch.

* * * * *